US012699899B1

(12) United States Patent
Zleteski

(10) Patent No.: US 12,699,899 B1
(45) Date of Patent: Aug. 4, 2026

(54) SYSTEMS AND METHODS FOR GENERATION OF SPARSE-DENSE MATRIX MULTIPLICATION CODE FOR NEURAL NETWORK AND OTHER APPLICATIONS

(71) Applicant: Red Hat, LLC, Raleigh, NC (US)

(72) Inventor: Aleksander Zleteski, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/797,892

(22) Filed: Aug. 8, 2024

Related U.S. Application Data

(63) Continuation of application No. 18/472,360, filed on Sep. 22, 2023, now abandoned, which is a
(Continued)

(51) Int. Cl.
G06F 9/30 (2018.01)
G06F 3/08 (2006.01)
(Continued)

(52) U.S. Cl.
CPC ............. G06N 3/08 (2013.01); G06F 9/3001 (2013.01); G06F 9/3012 (2013.01); G06F 17/16 (2013.01); G06N 3/04 (2013.01)

(58) Field of Classification Search
None
See application file for complete search history.

(56) References Cited

U.S. PATENT DOCUMENTS 5,577,166 A * 11/1996 Mizuno ..................... G06N 3/08
                                                                  706/11
9,558,156 B1 * 1/2017 Bekas ..................... G06F 17/16
                                        (Continued)

FOREIGN PATENT DOCUMENTS

EP             3547115 A2 * 10/2019 ............. G06F 17/16
EP             3789893 A1 * 3/2021 ......... G06F 9/30036
WO     WO-2021054990 A1 * 3/2021 ............. G06N 3/082

OTHER PUBLICATIONS

'Bit-Tactical: Exploiting Ineffectual Computations in Convolutional Neural Networks: Which, Why, and How' by Lascorz et al., 2018. (Year: 2018).*
(Continued)

*Primary Examiner* — Steven G Snyder
(74) *Attorney, Agent, or Firm* — Kilpatrick Townsend & Stockton LLP

(57) ABSTRACT
Generating computer code to perform a matrix-multiply operation, for use in neural network compute or other applications may include determining parameters $R_r$ (number of rows for a plurality of partitioned matrices A'), Rc (number of registers used for each column of a target matrix C'), and $R_L$ (number of processor registers used as a source for targets for vector broadcast instructions. For each row r in A', having $R_r$ rows, operations may be performed such that for each column i, if the element at row r and column i is non-zero: a vector broadcast instruction may be generate to a register for the element at row r and column i; and a set of fused multiply-add (FMA) instructions may be generated having as parameters the register, a set of registers for a target matrix, and a memory location for input data.

17 Claims, 5 Drawing Sheets

Related U.S. Application Data continuation of application No. 18/075,770, filed on Dec. 6, 2022, now abandoned, which is a continuation of application No. 16/832,954, filed on Mar. 27, 2020, now abandoned, which is a continuation of application No. 16/751,940, filed on Jan. 24, 2020, now abandoned, which is a continuation of application No. PCT/US2019/040537, filed on Jul. 3, 2019.

(60) Provisional application No. 62/746,117, filed on Oct. 16, 2018.

(51) Int. Cl.
   *G06F 17/16* (2006.01)
   *G06N 3/04* (2023.01)
   *G06N 3/08* (2023.01)

(56) References Cited

U.S. PATENT DOCUMENTS

| | | | | |
|---|---|---|---|---|
| 9,811,775 | B2 * | 11/2017 | Krizhevsky | G06N 3/08 |
| 9,818,059 | B1 * | 11/2017 | Woo | G06N 3/063 |
| 10,157,045 | B2 * | 12/2018 | Venkataramani | G06N 3/048 |
| 10,223,333 | B2 * | 3/2019 | Chetlur | G06F 17/153 |
| 10,719,323 | B2 * | 7/2020 | Baum | G06F 9/3013 |
| 10,990,650 | B1 * | 4/2021 | Vantrease | G06N 3/063 |
| 11,132,423 | B2 * | 9/2021 | Chatterjee | G06F 9/30036 |
| 11,500,962 | B1 * | 11/2022 | Meyer | G06F 17/16 |
| 11,620,818 | B2 * | 4/2023 | Pillai | G06N 3/045 |
| | | | | 382/154 |
| 11,803,736 | B1 * | 10/2023 | Meyer | G06F 9/3013 |
| 11,842,423 | B2 * | 12/2023 | Appu | G06F 9/3001 |
| 11,899,614 | B2 * | 2/2024 | Ray | G06F 12/0862 |
| 11,960,566 | B1 * | 4/2024 | Vantrease | G06N 3/063 |
| 12,086,205 | B2 * | 9/2024 | Mei | G06F 9/30043 |
| 12,399,685 | B2 * | 8/2025 | Parra | G06F 7/5443 |
| 2007/0172148 | A1 * | 7/2007 | Hawley | G06V 10/48 |
| | | | | 382/281 |
| 2010/0076915 | A1 * | 3/2010 | Xu | G06N 3/063 |
| | | | | 706/25 |
| 2011/0119467 | A1 * | 5/2011 | Cadambi | G06N 20/10 |
| | | | | 712/27 |
| 2011/0296146 | A1 * | 12/2011 | Anand | G06F 9/3001 |
| | | | | 712/222 |
| 2012/0311299 | A1 * | 12/2012 | Blumrich | G06F 9/526 |
| | | | | 712/16 |
| 2013/0138589 | A1 * | 5/2013 | Yu | G06N 3/08 |
| | | | | 706/15 |
| 2016/0224465 | A1 * | 8/2016 | Morad | G06F 9/3887 |
| 2016/0239706 | A1 * | 8/2016 | Dijkman | G06N 3/045 |
| 2016/0321031 | A1 * | 11/2016 | Hancock | G06F 7/57 |
| 2016/0328643 | A1 * | 11/2016 | Liu | G06T 7/0012 |
| 2016/0358070 | A1 * | 12/2016 | Brothers | G06N 3/045 |
| 2016/0379109 | A1 * | 12/2016 | Chung | G06N 3/04 |
| | | | | 706/26 |
| 2017/0032487 | A1 * | 2/2017 | Ashari | G06T 1/20 |
| 2017/0103313 | A1 * | 4/2017 | Ross | G06F 15/8046 |
| 2017/0103317 | A1 * | 4/2017 | Young | G06N 3/063 |
| 2017/0132496 | A1 * | 5/2017 | Shoaib | G06N 3/048 |
| 2017/0169567 | A1 * | 6/2017 | Chefd'hotel | G06T 7/0012 |
| 2017/0193361 | A1 * | 7/2017 | Chilimbi | G06N 3/084 |
| 2017/0200094 | A1 * | 7/2017 | Bruestle | G06F 7/023 |
| 2017/0220524 | A1 * | 8/2017 | Herrero Abellanas | |
| | | | | G06F 18/2413 |
| 2017/0316311 | A1 * | 11/2017 | Pilly | G06N 3/045 |
| 2017/0316312 | A1 * | 11/2017 | Goyal | G06F 17/16 |
| 2017/0372202 | A1 * | 12/2017 | Ginsburg | G06N 3/045 |
| 2018/0004515 | A1 * | 1/2018 | Yamamura | G06F 9/3016 |
| 2018/0046900 | A1 * | 2/2018 | Dally | G06F 9/30018 |
| 2018/0096226 | A1 * | 4/2018 | Aliabadi | G06N 3/045 |
| 2018/0173571 | A1 * | 6/2018 | Huang | G06F 9/5044 |
| 2018/0253402 | A1 * | 9/2018 | Redfern | G06N 3/045 |
| 2018/0315159 | A1 * | 11/2018 | Ould-Ahmed-Vall | |
| | | | | G06N 3/045 |
| 2018/0322390 | A1 * | 11/2018 | Das | G06F 9/3888 |
| 2018/0336468 | A1 * | 11/2018 | Kadav | G06V 10/454 |
| 2019/0042250 | A1 * | 2/2019 | Anders | G06F 9/3016 |
| 2019/0042542 | A1 * | 2/2019 | Narayanamoorthy | G06F 17/16 |
| 2019/0056916 | A1 * | 2/2019 | Varma | G06F 9/30112 |
| 2019/0138902 | A1 * | 5/2019 | Matveev | G06N 3/04 |
| 2019/0156206 | A1 * | 5/2019 | Graham | G06N 3/08 |
| 2019/0156215 | A1 * | 5/2019 | Matveev | G06N 20/10 |
| 2019/0179818 | A1 * | 6/2019 | Lee | G06F 16/2458 |
| 2019/0212982 | A1 * | 7/2019 | Yoda | G06T 1/20 |
| 2019/0303743 | A1 * | 10/2019 | Venkataramani | G06N 3/063 |
| 2019/0354894 | A1 * | 11/2019 | Lazovich | G06E 1/00 |
| 2019/0370071 | A1 * | 12/2019 | Matveev | G06F 9/3877 |
| 2019/0370644 | A1 * | 12/2019 | Kenney | G06N 3/045 |
| 2020/0034710 | A1 * | 1/2020 | Sidhu | G06F 9/45504 |
| 2020/0097826 | A1 * | 3/2020 | Du | G06N 3/063 |
| 2020/0104717 | A1 * | 4/2020 | Alistarh | G06N 3/045 |
| 2020/0160181 | A1 * | 5/2020 | Zlateski | G06N 3/08 |
| 2020/0160182 | A1 * | 5/2020 | Matveev | G06N 3/045 |
| 2020/0193274 | A1 * | 6/2020 | Darvish Rouhani | G06N 3/063 |
| 2020/0218978 | A1 * | 7/2020 | Kopinsky | G06N 20/10 |
| 2020/0342301 | A1 * | 10/2020 | Miao | G06F 17/153 |
| 2023/0064381 | A1 * | 3/2023 | Yinger | G06F 7/5443 |
| 2024/0045685 | A1 * | 2/2024 | Adelman | G06F 9/30036 |

OTHER PUBLICATIONS

'Designing Vector-Friendly Compact BLAS and LAPACK Kernels' by Kim et al., 2017. (Year: 2017).*

Machine Translation of Chinese Patent Application CN 111767079 A, published 2020. (Year: 2020).*

'How to Multiply Matrices' from Math is Fun, archived on Oct. 5, 2017. (Year: 2017).*

Yang, Huanrui, Wei Wen, and Hai Li. "Deephoyer: Learning sparser neural network with differentiable scale-invariant sparsity measures." (2019). (Year: 2019).*

Yuster, Raphael, and Uri Zwick. "Fast sparse matrix multiplication." ACM Transactions On Algorithms (TALG) 1.1 (2005): 2-13. ( Year: 2005).*

Park, Jongsoo, et al. "Faster cnns with direct sparse convolutions and guided pruning." (2016). (Year: 2016).*

Paixao, Crysttian A., and Flavio Codeco Coelho. Matrix compression methods. No. 1049. PeerJ PrePrints, 2015. (Year: 2015).* https://www.kinematicsoup.com/news/2016/9/6/data-compression-bit-packing-101, published Sep. 6, 2016. (Year: 2016).*

Robert Lim; "Methods for Accelerating Machine Learning in High Performance Computing"; University of Oregon—AREA-2019-01. (Year: 2019).*

Zhizhou Li et al.; "A CPU-based Algorithm for Traffic Optimization Based on Sparse Convolutional Neural Networks"; 2017 IEEE 30th Canadian Conference on Electrical and Computer (CCECE). (Year: 2017).*

Baoyuan Liu et al.; "Sparse Convolutional Neural Networks"; CVPR 2015—Computer Vision Foundation—IEEE. (Year: 2015).*

Hesham Mostafa et al.; "Parameter Efficient Training of Deep Convolutional Neural Networks by Dynamic Sparse Reparameterization"; Proceedings of the 36 the International Conference on Machine Learning, Long Beach, California, PMLR 97, 2019. (Year: 2019).*

Israt Nisa et al.; "Sampled Dense Matrix Multiplication for High-Performance Machine Learning"; 2018 IEEE 25th International Conference on High Performance Computing (Hi PC). (Year: 2018).*

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).*

Zhangxiaowen Gong et al. "Sparse Train: Leveraging Dynamic Sparsity in Training DNNs on General-Purpose SIMD Processors"; Nov. 2019. (Year: 2019).*

Kurtz, Mark et al. "Inducing and Exploiting Activation Sparsity for Fast Neural Network Inference." Proceedings of the International Conference on Machine Learning. Jul. 2020. (Year: 2020).*

Kaya et al., "Scalable sparse tensor decompositions in distributed memory systems", SC'15: Proceedings of the International Confer-

(56)    References Cited

OTHER PUBLICATIONS ence for High Performance Computing, Networking, Storage and Analysis, IEEE, 2015. (Year: 2015).*

Liu et al., "Sparse convolutional neural networks", Proceedings of the IEEE conference on computer vision and pattern recognition, 2015. (Year: 2015).*

Smith et al., "SPLATT: Efficient and parallel sparse tensor-matrix multiplication", 2015 IEEE International Parallel and Distributed Processing Symposium, IEEE, 2015. (Year: 2015).*

Alwani et al., "Fused-layer CNN accelerators", 49th Annual IEEE/ ACM International Symposium on Microarchitecture (MICRO), 2016, pp. 1-12. (Year: 2016).*

Budden et al., "Deep tensor convolution on multicores", In Proceedings of the 34th International Conference on Machine Learning, 2017, vol. 70, pp. 615-624. (Year: 2017).*

Chen, Xuhao, "Escoin: Efficient Sparse Convolutional Neural Network Inference on GPUs" from Jul. 2017 "Conference '17", Apr. 3, 2019. (Year: 2019).*

Despande, Adit, "A beginner's guide to understanding convolutional neural networks", Jul. 20, 2016. (Year: 2016).*

Du et al., "Width Provably Matters in Optimization for Deep Linear Neural Networks", May 27, 2019. (Year: 2019).*

Gale et al., "The State of Sparsity in Deep Neural Networks", Feb. 25, 2019. (Year: 2019).*

Georganas et al., "Anatomy Of High-Performance Deep Learning Convolutions On SIMD Architectures." In: SC18: International Conference for High Performance Computing, Networking, Storage and Analysis. Aug. 20, 2018. (Year: 2018).*

Han et al., "Learning both Weights and Connections for Efficient Neural Networks", 2015, Advances in Neural Information Processing Systems, vol. 28. (Year: 2015).*

Hinton et al., "Distilling the Knowledge in a Neural Network", Mar. 9, 2015. (Year: 2015).*

Lavin et al., "Fast Algorithms for Convolutional Neural Networks", Nov. 10, 2015. (Year: 2015).*

Lecun et al., "Optimal brain damage", Advances in neural information processing systems, 1990, pp. 598-605. (Year: 1990).*

Liu et al., "Sparse convolutional neural networks." In: Proceedings of the IEEE Conference on Computer Vision and Pattern Recognition. Jun. 12, 2015. (Year: 2015).*

Mishra et al., "Apprentice: Using Knowledge Distillation Techniques to Improve Low-Precision Network Accuracy", Nov. 15, 2017. (Year: 2017).*

Papyan et al., "Convolutional neural networks analyzed via convolutional sparse coding." In: The Journal of Machine Learning Research. Jul. 17, 2017. (Year: 2017).*

Rusu et al., "Progressive Neural Networks", Sep. 7, 2016. (Year: 2016).*

Scardapane et al. "Group sparse regularization for deep neural networks." In: Neurocomputing. Jul. 2, 2016. (Year: 2016).*

Wozniak et al., "GiMMiK—Generating bespoke matrix multiplication kernels for accelerators: Application to high-order Computational Fluid Dynamics", Computer Physics Communications, vol. 202, 2016, pp. 12-22. (Year: 2016).*

* cited by examiner

SYSTEMS AND METHODS FOR GENERATION OF SPARSE-DENSE MATRIX MULTIPLICATION CODE FOR NEURAL NETWORK AND OTHER APPLICATIONS

CROSS-REFERENCE TO RELATED APPLICATION DATA

This application is a continuation of prior U.S. application Ser. No. 18/472,360, filed on Sep. 22, 2023, which in turn is a continuation of prior U.S. application Ser. No. 18/075,770, filed on Dec. 6, 2022, which in turn is a continuation of prior U.S. application Ser. No. 16/832,954, filed on Mar. 27, 2020, which in turn is a continuation of prior U.S. application Ser. No. 16/751,940, filed on Jan. 24, 2020, which in turn is a continuation of PCT International Application No. PCT/US2019/040537, International Filing Date Jul. 3, 2019, claiming benefit from U.S. provisional patent application No. 62/746,117, filed on Oct. 16, 2018 and entitled "SYSTEMS AND METHODS FOR GENERATION OF SPARSE-DENSE MATRIX MULTIPLICATION CODE FOR NEURAL NETWORK AND OTHER APPLICATIONS", each of which being incorporated herein by reference in its entirety.

FIELD OF THE INVENTION

The invention relates generally to compiling computer code for matrix multiplication; specifically to code for matrix multiplication for operating neural networks or for use in other applications.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons may be for example a real number, and the output of each neuron may be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the output layer, and a lower layer, preceding layer, or a layer "below" another layer, is a layer towards the input layer.

Such systems may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) is a deep, feed-forward network, which includes one or more convolutional layers, fully connected layers, and pooling layers. CNNs are particularly useful for visual and speech applications. Other NNs include for example long short-term memory (LSTM) networks.

A NN may be modelled as an abstract mathematical object, such as a function. Thus the NN may be "virtual" and no actual physical neurons, links, etc. may exist, these existing rather as data executed by processors. A NN may be translated physically to a CPU (e.g. a traditionally architecture computer, such as a PC) or graphics processing units (GPUs, specialized processors) as for example a sequence of matrix operations where entries in the matrix represent neurons and/or links (e.g. artificial neurons connected by edges or links) or other NN parameters and matrix functions represent functions of the NN. GPUs and similar massively parallel hardware devices may be used to provide the large amounts of compute typically needed to train and/or perform inference (e.g. operate at run-time) in NNs. GPUs can have thousands of relatively weak compute cores, small caches, but high memory bandwidth. This contrasts with traditional CPU architectures, that have few powerful cores, very large caches, low memory bandwidth, and have each core executing different instructions at different times in an asynchronous fashion.

In both GPU and CPU architectures, the neural network's weights and inputs may be represented as matrices, and the computation of the network (e.g. the inference or run-time operation) includes a sequence of multiplications of these matrices. Thus, developing fast matrix multiplication algorithms is key to the performance of NNs. Properties of these matrices can enable faster matrix multiplication algorithms. One such property is sparsity—a matrix is said to be sparse if it contains a lot of entries that are zero (0). While the input matrix of data to be processed at inference or run time (and the sparsity of the input matrix) is usually out of the network designer's control, the weights of the neural network can be made sparse using a technique called pruning. Among the many parameters in a neural network, a fair fraction are redundant and do not contribute much to the network's output. One may, for example, rank the neurons in the network according to how much they contribute, and then remove the low ranking neurons from the network by setting their matrix entries to 0. If the process of pruning is done properly, the resulting sparse network, the one where some of the weights are zero, can actually have the same or improved accuracy relative to the original network. The big benefit however, even when some accuracy is lost, is that the resulting network could be smaller and could have a smaller memory footprint with a proper sparse matrix representation. Computation during the matrix multiplication may be reduced if multiplying by the entries of the weight matrix that are zero is avoided.

Not computing the zero elements, when the pattern of zero's is unpredictable, may require executing—e.g. at run-time or inference—a test (e.g. if zero then . . . ) to check if an element is zero, and this "branch" is a costly operation. On a GPU the cost of such a branch is a breaking of the "swarm," the collection of cores that do exactly the same thing. If there is a branch, some cores will do one thing and others another, leading to unreasonably low utilization of the GPUs synchronous SIMD execution style. On a CPU a branch is also a costly instruction.

Applications other than NNs may use matrix multiply operations which may benefit from sparsification.

SUMMARY

A system and method may generate computer code to perform a matrix-multiply operation, for use in NN compute or other applications. Parameter optimization may include determining parameters $R_r$ (e.g. the number of rows for a number of partitioned matrices A', e.g. storing NN parameters such as weights), Rc (e.g. the number of registers, typically vector registers, used for each column of a target matrix C', e.g. storing an output of a matrix computation), and $R_L$ (e.g. the number of processor registers used as a source for targets for vector broadcast instructions). For each row r in A', having $R_r$ rows, operations may be performed such that for each column i, if the element at row r and column i is non-zero: a vector broadcast instruction may be generate to a register for the element at row r and column i; and a set of fused multiply-add (FMA) instructions may be generated each having as parameters the register, a set of registers for a target matrix, and a memory location for input data. The register referenced or used as a destination in the generate a vector broadcast instruction may be selected from a next available register from queue, e.g. a circular queue, of registers.

The software or code produced may be executed during a matrix multiply operations, for example as part of a larger application such as a NN inference application. Applications other than NN applications may be used.

During matrix multiplication, if the computations related to the zero elements are never performed, the overall computation may be reduced: execute the multiplication if the matrix entry is non-zero or do nothing if it is zero. The data or kernel size may also be reduced. While code size may be increased as compared with traditional matrix operation code, when the number of zero elements is large, the increase in instructions is greatly offset by the decrease in compute time, and the decrease in stored data size. Applications other than NNs may use matrix multiply operations which may benefit from sparsification and from executing only zero elements. Further, careful determining of parameters which govern code creation and/or matrix partitioning or blocking may also increase code execution efficiency.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
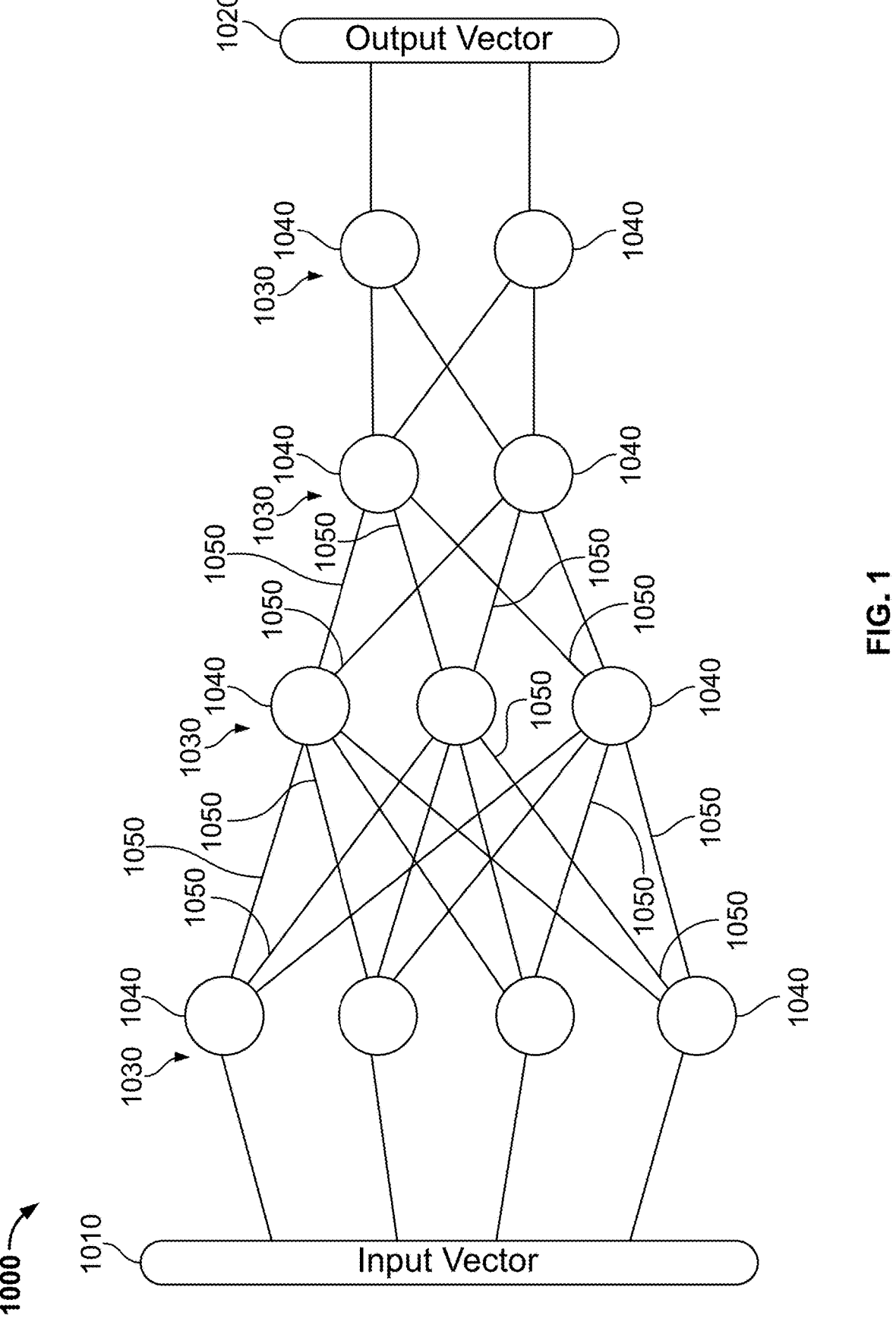
FIG. 1 is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may automatically create code or software for use by a NN execution computer for efficiently executing matrix multiplications, for example in NN inference (e.g. convolutional, fully connected or other), after for example pruning the matrices or NNs. While in NN contexts, code produced by embodiments of the invention is used during NN inference (e.g. run time), in some embodiments, code produced may be used during certain training portions. The code may be executed for example on multiprocessor architectures. The multiplication in the context of neural networks is typically between the matrix of weights, which is sparse because it has been pruned extensively, and the matrix of inputs (or modified inputs) to a NN at a first layer or inputs to an intermediate layer of a NN. The inputs may be dense (e.g. the input data matrix is not assumed to be sparse, in other words, it is not assumed to have many entries that are zero). Inputs to a NN may be for example an image to be categorized, speech data to be analyzed, etc.; inputs to layers may also be intermediate values sent from a previous NN layer which is to be processed using matrix multiply operations.

Embodiments may include methods to avoid performing unnecessary and costly operations associated with zero elements of a matrix such as branching instructions. This may be accomplished by developing from a sparse matrix executable code including only necessary multiplication operations on non-zero elements of the sparse matrix. In some applications, the zero and non-zero values in a sparse matrix are stable over time, and may be pre-determined as of compile or code-generation time. When the same neural network is executed on different inputs, the pattern, e.g. which multiplications are avoided by not being included in the compiled code because the corresponding element of the weight matrix is zero, typically remains the same. Subsequent training typically does not change this pattern because the pruned weights remain zero, and their corresponding multiplications are avoided. Other weights may change, but their corresponding multiplications are performed. In other words, to update the sparse matrix by changing the value of a non-zero weight, merely changing the corresponding value within the code is needed, and the code will continue to work properly for multiplying with the updated sparse matrix. Thus a new sparse matrix with different non-zero values, but zeroes in the same place, may be used to modify only the .data section of already created code, avoiding recompilation. Even if some additional weights become zero, those multiplications can still be performed: the weights that were zero because of pruning remain zero after training, and the corresponding multiplications can still be avoided.

The same sparse matrix may be repeatedly used in code generation, and the generated code may be used many times (e.g. many NN inferences), saving much time as each time the generated code is executed, less code is executed than if zeros were branched on or otherwise considered at execution time. The code generated may include an instruction representation which is shortened relative to standard instruction length and also which may increase arithmetic intensity (AI). The AI of code or an algorithm may be the number of compute operations it performs per byte fetched from, or stored to, a certain level of the memory hierarchy (e.g. shared cache or main memory).

Compiling or creating computer instructions or code corresponding to or based on the sparse matrix may be performed, in such a way that it can be executed efficiently on modern multiprocessors. On a given multiprocessor, the maximum amount of computation that can be performed per cycle is fixed, hence efficiency is measured by compute utilization, e.g. a fraction of the time spent on actual computation on a given piece of data as opposed to the time spent accessing that piece of data from memory. In order to achieve high compute utilization on modern multiprocessors (including both CPUs and GPUs), vector processing instructions may be used, such as fused multiply-add (FMA), that operate on multiple items or words of data simultaneously.

Embodiments may perform a multiplication algorithm between a single fixed sparse matrix (e.g. in a NN context, containing or representing NN parameters) and a collection of dense matrixes (e.g. in a NN context, input data such as an image) in a highly efficient manner by utilizing for example the FMA or other vector instructions available on modern multiprocessors. An embodiment may transform the sparse matrix into executable code, which contains a floating-point multiply-add instruction such as an FMA instructions for each non-zero element—and typically no FMA instruction or other instructions for zero elements in the sparse matrix. Each processor when executing the NN (e.g. at interference) can perform at most a certain number of FMA instructions per cycle (typically in parallel). An embodiment may improve throughput, and cache and register use (cache and registers typically being fast-access storage in or close to a processor, as opposed to memory which is external to a processor and thus having slower access), over prior architectures and achieve high utilization through careful ordering—e.g. by grouping certain independent FMA instructions together so they can be executed in parallel. Visiting only one non-zero element per visit to a row, where rows are visited iteratively in repeated iterations, may result in such efficient grouping of FMA instructions. Embodiments may achieve high utilization by producing code that operates to use registers after they are freed and use a large number of registers, by choosing a proper queue size for registers. The careful choice of the number of registers used per row (R, when discussed in a specific example below) may also optimize performance. While matrix multiplication in the NN context is discussed, embodiments may provide improvements in non-NN contexts.

Unlike previous approaches in which the compiled code stores addresses of elements, embodiments may store each value of the non-zero element of the sparse matrix within the code itself, as a constant (for example in a dedicated .data section for such constants); typically embodiments do not store the zero elements of the sparse matrix. Each FMA instruction then multiplies some non-zero value of the sparse matrix (which may be broadcast to a vector register) by a set of consecutive elements of the dense matrix. Each value that is read and broadcast is multiplied by more than one subsequent sets of elements in the dense matrix. This way relative inefficiency of reading/broadcasting is amortized among many efficient FMA instructions, that provide highest throughput possible on modern multiprocessor architectures. Further, zero values do not result in calculation instructions, branch instructions, or indexing. Indexing may be avoided in that to review an input matrix for data, indexing may need to be used: by compiling code that includes within the code itself certain input matrix data, the indexing for that data is not performed at execute time.

Converting the sparse matrix—which includes many zero data elements—to code, reduces the size of data for the kernel (typically holding NN parameters), since only the non-zero elements of the kernel are included within the code (e.g. in the data store discussed herein). In some embodiments, 10-20 times less kernel data is included and distributed with NN code.

Embodiments may work on CPUs, GPUs, or other multicore computing devices. Embodiments may produce code such that NNs execute efficiently, e.g. such that the compute resources of the CPUs have a high utilization. This may be accomplished by compiling code corresponding to a sparse matrix that relies on fused multiply-add (FMA) instructions available on modern CPUs. This may be efficiently parallelizable among many processors using a standard blocking technique, in which the sparse-dense matrix multiplication task is split into multiple sparse-dense sub-matrix multiplication subtasks. Each of these subtasks may then performed for example on a single processor. The submatrices may then later be combined into a larger matrix, the output of a matrix multiply of the original matrices, using known methods. For example, matrices A (representing or including weights or parameters) and B (representing NN input data) may each be divided into submatrices, which may be multiplied, and the results combined into a matrix C representing A×B.

While FMA instructions may provide high throughput in terms of number of operations per performed per cycle, they also have substantial latency (e.g. time between invoking the instruction and having its result available). Therefore, to achieve high utilization embodiments may incorporate enough independent FMA instructions, that will be pipelined by the target processor, and utilize the high throughput of the FMA units. This may result from repeatedly iterating down rows of a sparse matrix, where in each iteration, one non-zero element in a row is visited, and in the next iteration, the next non-zero element if any, is visited. Embodiments may consider the effects of particular blocking schemes, e.g. sizes of sub-matrices in each subtask, on the efficiency of the resulting multiplication. Blocking may be chosen to maximize efficiency.

Embodiments may improve processing and lead to significant speedups when used on multiprocessors for applications performing sparse-dense matrix multiplications where the sparse matrix has a fixed or mostly fixed sparsity pattern; this includes NN processing (e.g. inference) and other applications. Multiplication of a sparse matrix with a dense matrix is a building block of an increasingly larger number of applications in many areas beyond deep learning.

Some multicore CPU processors include several layers of cache. For example, on some Intel many-core (e.g. desktop or server) processors a third level of cache, known as the L3 cache, is large and shared among all of a processor's computing cores. Other levels of cache, such as L1 and L2, are faster and private to a specific core. Some embodiments of the invention may take advantage of this relationship (while some specific embodiments are described in terms of L1, L2, and L3 cache levels as in Intel architectures, embodiments may work with other architectures with a hierarchy of shared and core-exclusive cache levels). For caches and memory, the compute-to-memory ratio (CMR) may be defined as the ratio between the system's maximal number of compute operations per second, and its memory bandwidth. For example X86 family CPUs may have an FMA instruction set that is an extension to the "Streaming SIMD Extensions" instructions which may perform fused multiply-add (FMA) operations that operate on long bit vectors, for example 128 bits, 256 bits, or even 512 bits. For example, a single 512-bit FMA instruction can be used to multiply 8 pairs of 32-bit numbers, and add another accumulator number to each product. Embodiments of the invention may use such instructions.

If the AI of an algorithm executed on some architecture is not higher than the CMR of some memory level on that architecture, the execution will be memory bound, e.g. bottlenecked on bringing the data in or out of that memory level. In such a case, the algorithm may behave as it were being executed on a processor capable of fewer compute operations per unit time. The ratio between the theoretical, and effectively achieved number of compute operations per unit time is equal to AI/CMR. This ratio may be described as the processor's utilization (typically at the given memory level). In order to fully utilize the CPU's computational power, the number of compute operations of an algorithm per item brought from or stored to a given memory level (e.g. main memory or cache) should exceed the system's CMR. One way to increase the AI on a modern CPU includes reducing or eliminating branching, conditionals, and indirection, and to execute the majority of instructions as FMAs.

Compute utilization typically measures a theoretical maximum. For example, if an algorithm has full compute utilization (more than 100%) at all memory levels, then theoretically the execution of the algorithm can be compute bound, e.g. never limited by the memory bandwidth. However, being actually compute bound depends on how the memory accesses are distributed: if the algorithm performs all memory accesses before performing all computation, then the average compute utilization of the whole algorithm may be high, while the first stage of its execution is extremely memory bound. But an algorithm with a reasonably uniform memory access distribution is likely to utilize a fraction of the CPU's available FLOPS (floating point operations per second) which is close to its theoretical maximum (e.g. minimum of compute utilization among all memory levels).

Embodiments of the invention may automatically generate ahead of the computation, once the sparse matrix is known, the multiplication code only for the computations of the non-zero entries in the sparse matrix, and not generate any code for the zero entries. Producing this code from a compiler may include analyzing (e.g. by a processor) the matrices ahead of the computation and properly laying out the sequences of registers and FMA instructions that need to be executed, e.g. via pseudocode operating per parameters set per the analysis described herein. This may use a particular structuring of the dependencies of the FMA instruction sequences for example as created by the pseudocode described in Table 1 herein. Creating such sequences to provide high compute utilization may depend on the sparse matrix, but also on the correct structuring of the computation with respect to the dense matrix parameters so that the computation as a whole is effective in terms of cache use and instruction throughput. For example, in the pseudocode in Table 1 below, the novel ordering of creation of FMA operations may be performed by visiting each row of the sparse matrix, visiting each non-zero element in that row (and after visiting the first non-zero element in a row, visiting the next lower row), and creating instructions to multiply the non-zero element by a row of a data matrix. This novel ordering may also improve throughput. Travelling down rows to find non-zero elements may allow for non-dependent FMA operations to be created. While in Table a specific type of FMA instruction is used, other floating-point multiply-add instructions may be used.

In some embodiments, a process may generate code, e.g. machine code directed to a specific architecture. The parameters used to control the code generation process may be optimized, for example, based on constraints including latency for certain instructions and a number of registers available. Performing compute using registers, e.g. quickly accessible locations available to a computer's central processing unit (CPU), typically including a small amount of fast storage, typically speeds processing. Registers are typically small storage internal to a processor storing one or more words of data. A source sparse matrix A and source data matrix B may be divided to submatrices prior to processing and the output matrices C' maybe combined to a matrix C, where A×B=C. Matrix A may be divided prior to code generation, matrix B may be divided at run-time, and matrices may be combined to matrix C at run-time. Generating code or instructions which execute a quick sparse× dense matrix multiply (whether on a partial matrix if blocking is performed, or on a full matrix) may include: for each row r in a matrix A' having N columns, for each column i, if the element at row r and column i is non-zero, creating or generating a vector broadcast instruction to a register for the element of the sparse matrix at row r and column i; and generating N fused multiply-add (FMA) instructions, each instruction having as parameters the register, a set of registers for a target matrix (e.g. C or C'), and a memory location for input data. If the element is zero, no code is generated and no data is added to code, for that element. Matrix A' is typically a sparse matrix, whether a portion or the entirety of a sparse matrix. The code when executed may multiply A' by B', B' typically being a dense matrix, typically stored in memory (cache and registers typically being fast-access storage in or close to a processor, as opposed to memory which is external to a processor and thus having slower access). Generating a vector broadcast instruction to a register may include selecting a next available register from a circular queue of registers.

Optimizing parameters used to control the code generation process may include determining $R_r$, $R_c$, and $R_L$. $R_r$ may be for example the number of rows for the source sparse matrix A or A' (e.g. a neural network parameter matrix) if blocking is used and also the number of rows for the output register C or C'. $R_c$ may correspond to the number of registers used for the rows of source data matrix B (or B') and the output matrix C (or C') (each of B' and C' may have $S*R_c$ columns of data, where S is the number of entries in a register (e.g. vector register); thus there are $S*R_c$ numbers in each row). The number of data items in each row of the source data matrix and the output data matrix may be S times $R_c$, where S may be the number of data items or elements in each register. $R_L$ may be the number of registers in a queue of registers used as a source for the register for which the vector broadcast instruction is generated. $R_r$ and $R_c$ may be parameters used to decide how to divide a source matrix if blocking is used.

Optimizing or creating parameters which are, in turn, used to partition matrices may improve prior computer matrix multiplication processes by spending the resources to determine an optimal matrix partition or division, or blocking, at compile time, rather than at compute or execute time. Typically, the partitioning sizes for the matrices used are determined during compile or code generation time. The non-zero elements of a sparse matrix may be moved (e.g. partitioned) to a data store within the code (e.g. .data) at compile time. During compile time data input and output matrices may be only "logically" partitioned, such that during runtime (e.g. execution, or inference) logical sub-matrices are accessed, but data for these matrices is typically not moved to partition the matrices during runtime.

In NN applications, this may result in a NN executing faster, as matrix partitioning need not be computed or executed at execution time. Typically, NN execution or inference is performed many more times than the compilation of NN code, and thus one compilation producing improved code results in a large amount of saved resources.

While some embodiments may utilize known subdividing (e.g. blocking) of matrix multiply operations, such subdivision need not be used in other arguments. Some embodiments may optimize matrix subdivision to work with a maybe computed using the register file, e.g. using $R_c{\times}R_r$ registers. Multiple result submatrices C' may be combined into a final result matrix C which is A×B, according to known methods. Typically, a processor for which code is generated may include multiple registers or vector registers each including a number of values such as floating point values, the number of values of a register being its size S.

In one embodiment, a process following the example pseudocode in Table 1 (with comments starting with //) may be used as the core of a process to produce matrix multiply code (e.g. matrix code or software 302, described below), typically machine code for the relevant architecture, such as an X86 architecture. Other processor types may be used, such as for example AVX2 or AVX512 processors, e.g. provided by Haswell, Broadwell, Cascade and Skylake. In some embodiments, a specific processor may be designed, or specific instructions may be designed, to be used with an embodiment of the present invention such that the benefits of the invention are increased.

The example Table 1 code may attempt to issue as many FMAs per cycle given constraints of for example the target processor and may operate based on or take as input optimization or optimized parameters such as R_r, R_c, R_L, explained below, and/or other parameters. Other specific operations, different from those shown in Table 1, may be used.

TABLE 1

```
Generate/emit code to initialize output registers C_0 .. C_[R_c]=0;
While A' contains unvisited non-zero elements do:
        For r in 1 to R_r
            If r-th row of A' contains unvisited non-zero elements do
                Let e be the first unvisited non-zero element of row r (in column
                order); // Visit only one non-zero element per visit to a row.
                Let i = the column index of e in A' // e = the next to be visited non-
                zero element;
                Reserve a place in .data for e, and copy the value of e to .data;
                Let L be next line-register in the circular queue of R_L registers;
                Emit instruction BROADCAST of e to L (from offset location in
                .data) // offset in data is encoded in the instruction; e.g. vbroadcast
                For j in 1 to R_c:
                    Emit FMA: multiply L with memory at row i column j*S of
                    B' and accumulate to register C_j // The result is stored in
                    C_j. One instruction for a group of S columns in B' and C'.
                    Arguments to the FMA are register L; a memory location
                    (different for each FMA) for the i'th row in B or B'; and a
                    vector register (different for each FMA) storing results in C
                    or C' from its r'th row.
                End for
            End If
        End For
    End While
``` particular computer configuration that will execute the NN operations, taking into account for example register or vector configurations, instruction latency and/or other processor details. A matrix multiplication can be divided into sub-matrix multiplications as known in the art. In one embodiment the matrix multiplication of sparse matrix A and data matrix B may be divided into multiple tasks of where matrix A' (part of A) is multiplied by matrix B' (part of B). Each sub-matrix multiplication may compute a product of a matrix A'×B', the result being matrix C'. The size of A' may be $R_r{\times}\omega$, the size of B' is $\omega{\times}SR_c$, and the size of C' is $R_r{\times}SR_c$, where S is the size (in data units) of the available vector register in a particular target processor, in terms of the number of floating point numbers it can fit, ω is the number of columns chosen based on blocking strategy, and $R_r$ and $R_c$ are chosen as described herein. The resulting matrix C'

In the pseudocode in Table 1, the sequence "While A' contains unvisited non-zero elements do:/For r in 1 to R_r/If r-th row of A' contains unvisited non-zero elements do/Visit the next non-zero element" causes instructions to be issued for the first unvisited non-zero element of each row, travelling in row-increasing order, such that after the first unvisited non-zero element is visited for row X, the next row is visited, and the next non-zero element in row X is not visited until the row increase cycles back to row X. Only one element at a time is picked per row; the row counter increases after that one element is picked. In some cases, a row may be visited and have no non-zero elements, as they have been processed, or the row had none to begin with. The sequence "While A' contains unvisited non-zero elements do:/For r in 1 to R_r" may cause each row to be visited once, repeatedly and iteratively, until all non-zero elements in A' are visited and have instructions created for them.

The example pseudocode in Table 1 may generate code to iteratively multiply an element from column i in A' by entire row i in B' to a destination being a set of registers making up row i of destination matrix C'. Iteration is performed by rows over R_r. A' is a submatrix which is sparsified to include many, e.g. a majority, of 0 values for entries. A' may be for example a matrix of NN weights or other parameter. B' is a submatrix which may be for example input data to a NN, e.g. data representing an image to be categorized. R_r is the number of rows of A' (and C'), R_c is the number of registers used for columns of B' (and C'), where S*R_c is the number of columns for B' and C', S being the size of a register. Inputs matrix B' may also be inputs from a previous NN layer which is to be processed using matrix multiply operations. Thus the "If . . . " process is repeated once for each of R_r rows. Emit is the generation of a code instruction: Emit vbroadcast means create a vbroadcast instruction (e.g. Load with Broadcast Floating-Point Data, e.g. "BROADCAST"); and Emit R_c vfmadds means create a number R_c of vfmadd (or other FMA) instructions. Thus in the pseudocode above one FMA (e.g. vfmadd) instruction is created for each group of S columns in row r of matrix A' where S is the size of the registers used, ".data" may be a data store (e.g. data 303), for example embedded in or distributed alongside the created code, for the non-zero elements of matrix A. Emitting or creating a broadcast instruction (e.g. vbroadcast) may create such an instruction which sends data from an offset location in .data to a register L. Parameters for each FMA operation may be register L with multiple repeated single values, a memory location (or register) for row i in submatrix B', and a register of C' to be used (this register also being the output). The FMA operation when executed may multiply a first argument by a second argument (taken from a register), accumulating the value in the register corresponding to the third argument. The register corresponding to the third argument may be an input to the FMA operation, as its value is taken in, added to (e.g. accumulated), and updated into the same register. The FMA instruction when executed may multiply register L with row i in matrix B', accumulating in C. The number of FMA operations created for each data item may be the size of the row divided by the number of items in each register. For example, the same value repeatedly appearing in L may be multiplied by individual different values in a row in matrix B'. Typically the data in A' is known at compile (code generation) time but the data in B' is only known at run (e.g. inference) time, and thus typically B' is read from memory by the generated code.

Typically, if code generated is code that executes a submatrix as part of a blocking or partitioning, code may also be generated or integrated to, after the execution of the multiply code, combine the submatrix results C' matrices into one output matrix C. Partitioning in the sense of dividing matrices may be done for a sparse matrix by appropriately placing data and instructions in generated code, and for a run-time input data matrix, by generating instructions to access that matrix appropriately.

A may be the "left" matrix in a typical NN matrix multiplication, the matrix of a trained kernel, representing for example weights. A' may be a submatrix of such a kernel matrix in the cases where submatrix multiplication is used, or may be the full kernel matrix. If submatrices are used, the products of the submatrix multiplications may be combined using known methods into a larger matrix which is the matrix multiply of the original matrices. Typically, no code is created for zero elements of A', obviating the need for a conditional or other instruction based on a zero entry in a matrix, and resulting at run-time (e.g. inference or learning in NN applications) of no code being executed or existing for the zero entries. The process may loop or iterate for all rows in the sparse source matrix. In one embodiment the "if a value in a sparse matrix is zero" determination is performed at compile time, by checking if an element of the sparse matrix is zero, and if yes doing nothing, and if no, generating code for that element.

Typically, a target processor (executing the produced code) has limited registers, and a matrix multiply process is typically performed using a processor's internal matrices for speed and efficiency. The resulting matrix C' may be stored in R_c×R_r registers, and may have a matrix size of R_r× (S×R_c), where S is the number of data elements per register; e.g. a S×R_c data items in each row. The example of Table 1 assumes the existence of a circular queue of size $R_L$ of vector "line-registers". In operation, the code produced by the pseudocode of Table 1 may use a processor's registers (e.g. vector registers), in a queue or circular queue fashion. Registers in a processor may be used for multiple purposes by such pseudocode or other code, such as broadcasting kernel values, and for example floating point operations. The vector broadcast instruction may be generated to a next available register from a circular queue of registers, the size of the queue being defined by an optimization operation which returns parameters used by a process such as shown in Table 1. The process may increment in circular fashion each register chosen.

Parameters may be optimized for a specific target processor architecture, and software or code may be generated for the specific architecture. A process may optimize $R_r$, $R_c$ and $R_L$, which may be expressed also as R_r, R_c and R_L and these optimized parameters may be used by a process such as described by Table 1 above. For example, R_L may define the number of registers used in a circular queue from which registers are chosen. The input parameters to such an optimization process may be the parameters of the target processor or CPU, such as for example the number of read ports, the number of arithmetic ports, and the latency of the relevant FMA operation. In practice, a processor may pick different combinations of $R_r$, $R_c$ and $R_L$, and determine which combination produces the optimal result. Since the limit N of the total number of registers is typically not a large number (e.g. N=32 in some current processors), a process may try out each combination of $R_r$, $R_c$ and $R_L$, which are typically integers, such that $R_c + R_L \leq N$ and other constraints are followed. $R_r$, $R_c$ are typically limited by the input matrix size, and Rc is typically chosen to be as large as possible.

A process may analyze utilization, based on the choices of $R_r$, $R_c$ and a target processor's limitations. One limit is the number N of available vector registers. A process may require $R_r$ times $R_c + R_L$ to be less or equal to the total number of available vector registers N for the target processor, e.g. $R \times R_c + R_L \leq N$. Another limit may be on the number of issued, independent, FMA instructions. In order to saturate the vector units, a processor may need to issue $2L_{FMA}$ independent instructions (e.g. not dependent on the completion of another FMA instruction), where $L_{FMA}$ is the latency of the issued FMA instructions. Latency may be measured in CPU or other clock cycles, and may be in one implementation 3 to 20 clock cycles. Thus, a process may require $R_r \times Rc \geq 2 L_{FMA}$. However, FMA instructions may have an in-memory argument, which in one particular processor implementation uses one of the two available read ports (other numbers of ports may be used with other embodiments). While performing the vector broadcast to a line register, one of the read ports will be busy. This provides a limit on the maximal utilization. For each $R_c$ number of FMA instructions a process may need to issue one broadcast. Hence, the maximal utilization is $R_c/(R_c+1)$. This also provides a better bound on the number of independent vector instructions that need to be issued. For each $R_c$ FMAs, the read ports will be saturated $R_c+1$ times. Hence, $R_r (R_c+1) \geq 2L_{FMA}$.

For code resulting from the code generation process of the innermost loop of the pseudocode in Table 1 above, the computation may be performed as follows:

A broadcast is performed to one of the $R_L$ line registers, using one of the two read ports (in other embodiments, other numbers of ports may be used);

The value is then available in $L_B$ cycles, where $L_B$ is the latency of the vector broadcast instruction;

After which, the $R_c$ issued FMAs can be executed (for example, in one implementation, two in each cycle);

All $R_c$ FMAs have started the execution by cycle $L_B+R_c/2$. At this point the used line register can be reused.

Each line register should be alive for $L_B+R_c/2$ processor cycles, while saturating the ports in $R_c/2+1/2$ cycles. This may provide bounds on the number of required line registers, that allow for full saturation of the CPUs ports, which may be expressed as the minimum number of registers R:

$$R \geq (2L_B + R_c)/(R_c + 1)$$

Hence, $R_r \times R_c + (2L_B + R_c)/(R_c + 1)$ should be less or equal to the total number of available registers for the target processor. As the maximal utilization is $R_c/(R_c+1)$, larger values for $R_c$ are preferred.

Figure 2:
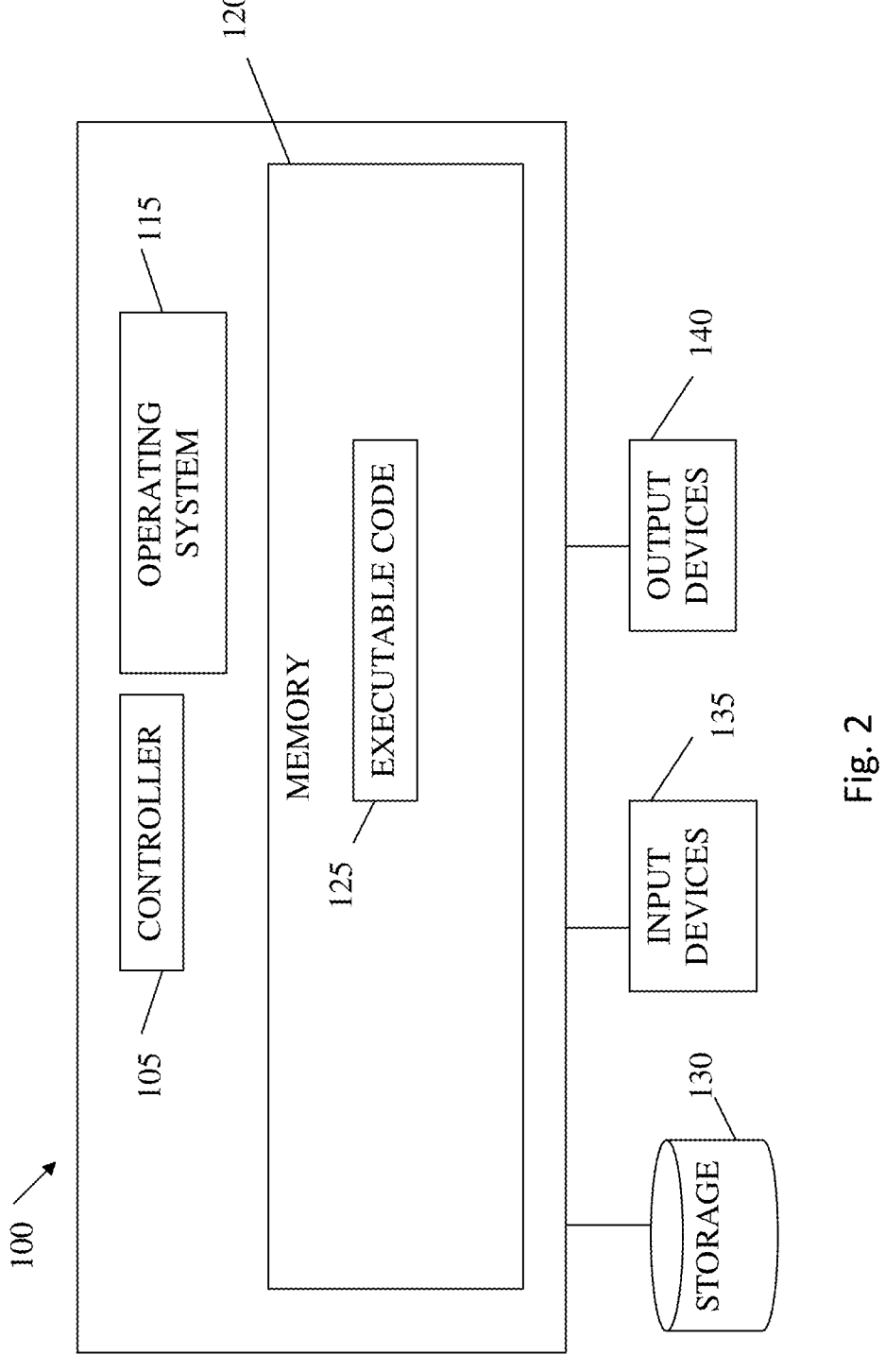
FIG. 2 is a high-level block diagram of an exemplary computing device which may be used with embodiments of the present invention.
Figure 3:
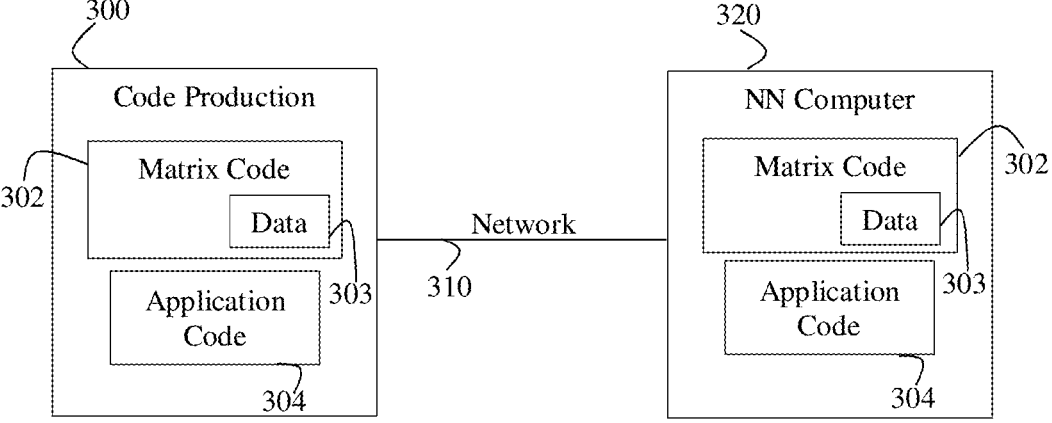
FIG. 3 is a high-level block diagram of an exemplary computing system which may be used with embodiments of the present invention.

The algorithms and methods described above are now elaborated on with respect to the systems of FIGS. 1-3; however other specific systems may be used.

FIG. 1 is a simplified block diagram of a NN which may be operated on or computed according to an embodiment of the present invention; in typical use thousands of neurons and links are used. In one embodiment software or code generated simulates the operation of NN 1000. NN 1000 may input data as for example an input vector 1010 of values (representing, e.g. a photograph, voice recording, or any sort of data), and may produce an output of signals or values, for example output vector 1020. NN 1000 may have neurons arranged into layers 1030, each including neurons 1040 connected to other neurons by links or edges 1050. NN 1000 may input data, for example an image (e.g. an input vector, matrix or other data) and may produce an output of signals or values, for example output vector 1020, which may for example indicate the content of or a description of the image. Other input data may be analyzed. NN 1000 may in one example have layers such as convolution, pooling, output layers, an FC layer, softmax layer, etc. Each layer may include neurons connected to other neurons by links or edges. The NN in FIG. 1 is typically simulated, and represented as data, for example by systems such as shown in FIGS. 2 and 3, using code such as generated herein. While specific numbers and types of layers are shown, FIG. 1 is merely a highly generalized example, and NNs used with embodiments of the present invention may vary widely as known in the art.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Each of modules and equipment such as code production computer 300, NN computer 320, a NN as shown in FIG. 1 and other modules or equipment mentioned herein may be or include, or may be executed by, a computing device such as included in FIG. 2, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause the production or compilation of computer code, or application execution such as NN execution or inference, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a high-level block diagram of an exemplary computing system which may be used with embodiments of the present invention. Code production computer 300 may produce matrix code or software 302 for use in inference for NNs, or may produce code for other applications using matrix multiplication. Matrix code or software 302 may include sparse data 303, e.g. the non-zero entries from an input dataset or matrix. Code 302 may execute sparse-dense multiplication as described herein, and may be executed in conjunction with, or may be combined with, application or NN code 304 such as TensorFlow or PyTorch open-source code, which may perform known operations for inference (e.g. runtime) for NNs. Application code 304 may interface with code 302, where code 302 may when executed handle certain matrix operations, and code 304 may handle other aspects of NN inference as known in the art. Application code 304 may interface with code 302 to for example execute or train a NN such as shown in FIG. 1. Code 302 if used for another application may include other code managing such an application; in such a case code 304 may manage such other non-NN applications.

Code production computer 300 may communicate, e.g. via a network 310 (e.g. the internet) with NN computer 320. NN computer 320 may train and or execute (e.g. inference) a NN by using (e.g. executing) code 302 and/or code 304. In some embodiments NN computer 320 may manage execution of a NN in cooperation with other computers, e.g. a cloud server, or a set (e.g. pod) of servers or computers, such that part of code 302 and/or code 304 may be executed by another computer separate from or remote from computer 320.

While code 302 is shown existing at code production computer 300, in some embodiments code production computer 300 may produce NN code 304, and deliver to another computer such as NN computer 320 which may integrate or use code 302 with code 304, where code 304 is not produced at code production computer 300. Code production computer 300 and NN computer 320 may be, be executed by, or include, elements of a computer such as shown in FIG. 2.

Figure 4:
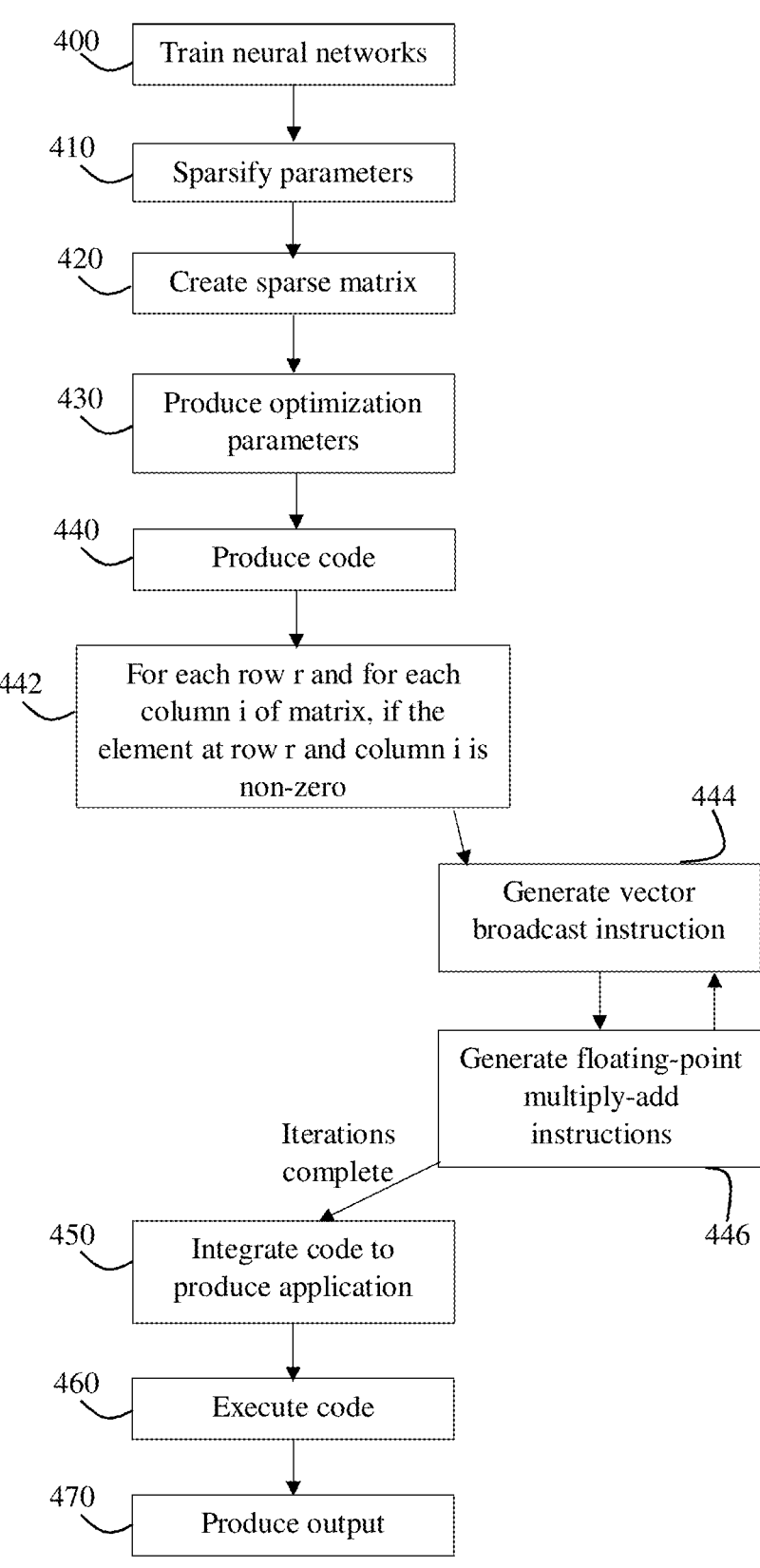
FIG. 4 is a flowchart of a method according to embodiments of the present invention.

FIG. 4 is a flowchart of a method for producing or compiling code and/or executing an application such as NN inference according to embodiments of the present invention. While in one embodiment the operations of FIG. 4 are carried out using systems as shown in FIGS. 1-3, in other embodiments other systems and equipment can be used.

In operation 400 a NN may be trained to produce a set of parameters, e.g. link weights. While a NN application is discussed in the specific example of FIG. 4, data used in embodiments of the present invention need not come from a NN.

In operation 410, the NN may be sparsified through known methods such as pruning, such that many non-zero link weights are converted to zero. For example parameters of the NN may be sparsified.

In operation 420, data that has been produced and sparsified, e.g. NN parameters, may be placed in a sparse matrix. Alternately, a produced matrix may be sparsified.

In operation 430, optimization parameters may be produced using as input parameters describing a target computer processor or system for which software or code is to be generated. Input parameters may be for example latency data for a processor (typically latency for vector processing instructions such as FMA instructions), the number of registers for the processor, and/or other parameters. Output of optimization may be for example dimensions of matrices or sub-matrices used, the number of registers, typically vector registers, used for matrix operations, and/or the size of a pool or a queue that includes registers used for matrix operations. For example, in one embodiment, $R_r$, $R_c$ and $R_L$ may be determined, where $R_r$ is the number of rows for a (yet to be) partitioned matrix A', $R_c$ is the number of registers used for each row of a target matrix C', and $R_L$ is the number of registers in a queue of registers to be used as a source for targets for vector broadcast instructions.

In operation 440, code or software (e.g. matrix code 302) may be produced using as input a matrix produced in operation 420 and possibly optimization or optimized parameters. For example, a process as in example Table 1 above may be used; however other embodiments may use other specific processes. The code produced may be matrix multiply operations designed for a specific processor with specific parameters. For example, in operation 442, for each row r in a matrix having N columns, and for each column i, if the element at row r and column i is non-zero, a process may be performed. This process may include in operation 444, emitting or generating a vector broadcast instruction to a register for the element at row r and column i; and in operation 446, emitting or generating a number (e.g. N/(the number of entries in each register)) of floating-point multiply-add instructions (e.g., FMA instructions) having as parameters the register, a set of registers for a target matrix, and a memory location for input data.

Operations 442-446 may be iterated a number of times until no unvisited (e.g. unprocessed) non-zero elements remain. Operation 442 may cycle over rows in increasing row-order, generating instructions for one only (the first not-yet-processed or not-yet visited) non-zero element of the row and after that, visiting the next row; the series of rows may be visited in an iterative round-robin manner until all non-zero elements have instructions issued. In other words, the operation of iterating over row r in A' is itself iterated or repeated; and when each row is visited, the generate vector broadcast instruction and generate FMA instructions are carried out once for that row, per repeat of the for each row r in A' operation.

Generating or compiling code as in operation 440 may partition a sparse matrix in the sense that the non-zero elements of the sparse matrix are distributed appropriately in a data store in the resulting code. The sparse matrix A may be partitioned or divided in this virtual sense into a number of matrices A' having a number of rows $R_r$. Generating or compiling code as in operation 440 may partition a data input matrix (e.g. B') and data output matrix (e.g. C') in the sense that the generated code accesses these matrices in partitioned form. However typically these matrices are not actually partitioned in the sense that code is not used to move data to divide the matrices.

In operation 450, code produced in operation 440, may be combined with or integrated with other code used to operate an application, e.g. code to operate a NN, to produce a complete or combined set of code (e.g. matrix code 302 and application code 304) which may be used to, e.g. perform inference on a NN. In some embodiments, combination need not take place; rather the two sections of code may operate in conjunction with one another without being combined. Code may be generated or added to control the execution of the multiply code a number of times, for each of the submatrix pairs, and after the execution of the multiply code, combine the submatrix results matrices C' (e.g. multiple target matrices) into one final output matrix. As part of operation 450, code produced in operation 440 and/or combined code, may be distributed or transmitted from a production computer to a computer used to execute the code.

In operation 460, code produced, combined and/or distributed (e.g. at least in part matrix code 302) may be executed, possibly in combination with or while communicating with other code used to operate an application, e.g. code to operate a NN (e.g. application code 304). For example, one or more computers conducting NN inference, e.g. computer 320, may execute matrix multiply and other NN code, possibly having some execution take place on remote (e.g. "cloud") computers. Such execution may include, for example, multiplication of matrix data, such as data in data 303, by NN input data which is also represented by a matrix. Execution of such code may include controlling the execution of the matrix multiplication code, and combining the submatrix results into one output matrix. Data used as input may be input to a NN, or intermediate values sent from one NN layer to another.

In operation 470, a result or output may be produced by the executed code, e.g. via a NN, e.g. a classification of data.

Figure 5:
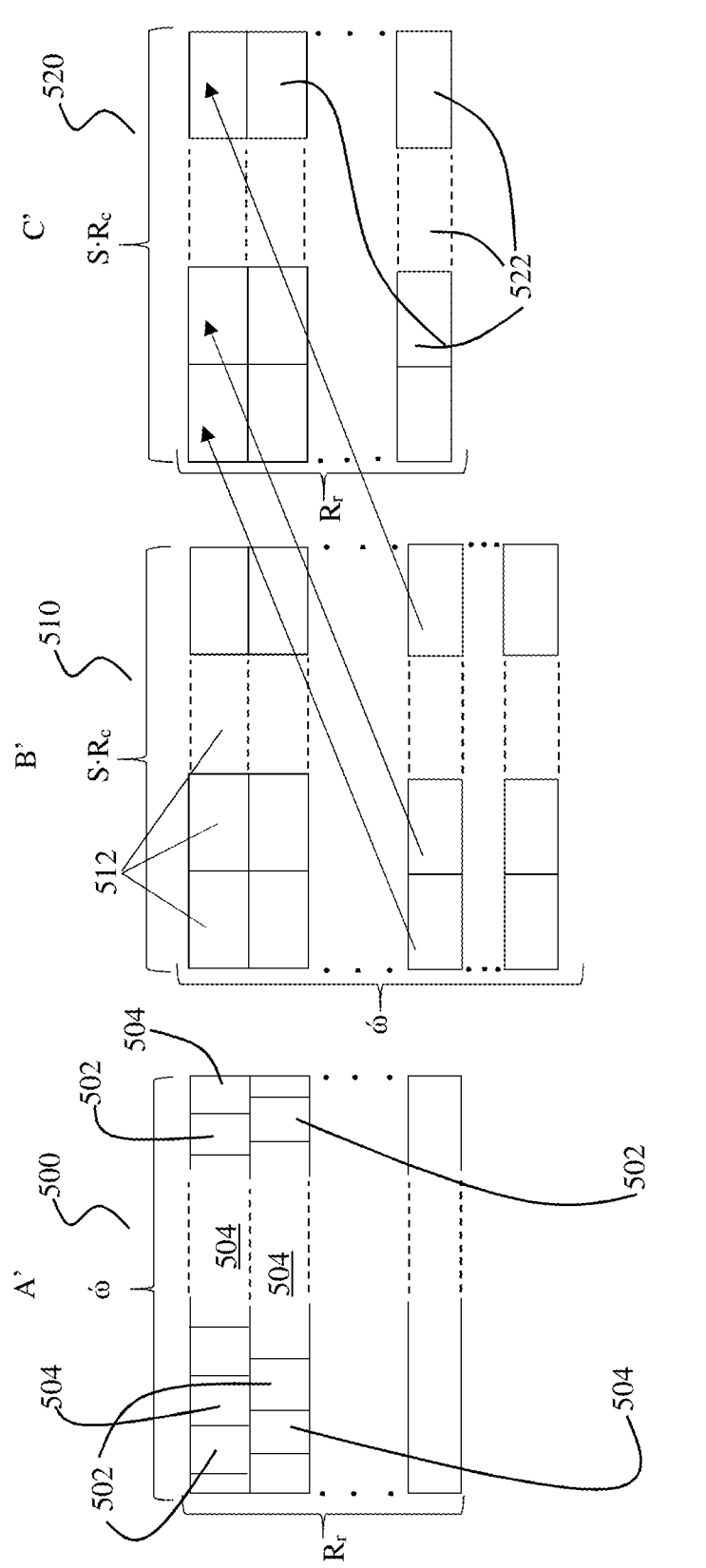
FIG. 5 is a schematic diagram of the relationship among matrix data according to embodiments of the present invention.

FIG. 5 is a schematic diagram of the relationship among matrix data according to embodiments of the present invention. Input matrix 500 may be an input matrix which is sparsified, where elements 502 represent non-zero elements and space 504 between elements 502 represents zero elements. Matrix 500 may have dimensions $R_r \times \omega$, e.g. $R_r$ rows and $\omega$ columns. Input matrix 510 may include for example run-time input data, and may have or be formed from or represented by register entries 512 each storing a number of matrix elements. Matrix 500 in its entirety may not be stored in final generated or compiled code; rather the relevant portion (e.g. non-zero elements 502) may be stored, e.g. in .data (e.g. data 303). Matrix 510 may have dimensions $\omega \times SRc$, such that each row has a length of SRc, where S is the number of elements within a register and Rc is the number of registers 512 storing data from each row. Matrix 520 having entries stored in registers 522 may be an output matrix having dimensions $R_r \times SR_c$. In one implementation, the non-zero entries of matrix 500 are stored in compiled or created code (e.g. in data 303 within matrix code or software 302) and the zero entries are not stored; matrix 510 may be stored largely in memory or storage external to a CPU or GPU at runtime (e.g. inference); and matrix 520 may be stored in registers in a CPU or GPU at runtime. Connection arrows show a correspondence between data in registers 512 which are partially source data for data in registers 522. In one embodiment, an output matrix or submatrix 522, e.g. C', may be stored and have values accumulated only in registers, increasing speed of execution.

Embodiments of the present invention may improve prior NN inference by for example avoiding completely both certain matrix multiplication operations involving zero parameters and also branch operations (e.g. if zero then do not multiply) which may attempt to avoid such zero operations. In prior art systems, a kernel—e.g. a set of weights or other parameters—may be combined with NN code such as TensorFlow or PyTorch open-source code, which may take input data and perform inference on the NN which may include matrix multiplication of zero entries in the kernel, or branch operations to avoid multiplication on zero items. In contrast, embodiments of the present invention may include only non-zero kernel values in compiled code, and only operations to perform multiplication operations on those non-zero kernel values in the compiled code. Thus, unlike prior art NN architectures, code specific to a NN may be compiled specific to a kernel or set of parameters.

While embodiments have been described in the context of NN learning, data processing in other contexts may make use of matrix multiply and computer code generation methods as described herein. Embodiments of the invention may be applicable to NNs computed with any sort of nodes, e.g. CPUs, GPUs, or other types of processors.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method comprising, prior to an inference phase of a neural network:

generating computer instruction code for execution in relation to a matrix-multiply operation of the neural network, wherein generating the computer instruction code involves:

for each row r and each column i in a sparse neural network parameter matrix associated with the neural network:

analyzing an element at row r and column i to determine whether the element is a zero element or a non-zero element; and if the element at row r and column i is a non-zero element:

generating, in the computer instruction code, a vector broadcast instruction to a register for the element at row r and column i; and generating, in the computer instruction code, a set of fused multiply-add (FMA) instructions having as parameters the register, a set of registers for a target matrix, and a memory location for input data; or if the element at row r and column i is a zero element, omitting corresponding instructions for the element from the computer instruction code; and compiling the computer instruction code into compiled code, wherein the compiled code is configured to be subsequently executed during the inference phase of the neural network to perform the matrix-multiply operation using the vector broadcast instruction and set of FMA instructions generated for each non-zero element.

2. The method of claim 1, wherein generating a vector broadcast instruction to a register comprises:

selecting a next available register from a circular queue of registers for use as the register.

3. The method of claim 1, further comprising incorporating, into the computer instruction code, an additional set of instructions to combine more than one produced target matrix into a final matrix.

4. The method of claim 1, further comprising determining $R_r$, $R_c$ and $R_L$, where $R_r$ is the number of rows for the sparse neural network parameter matrix, $R_c$ is the number of registers used for each row of the target matrix, and $R_L$ is the number of registers in a queue of registers used as a source for the register for which the vector broadcast instruction is generated.

5. The method of claim 1, wherein the input data is represented as an input data matrix, the method further comprising determining $R_r$ and $R_c$, where $R_r$ is the number of rows for the target matrix, and Rc is the number of registers used for each row of the input data matrix.

6. A method comprising, prior to an inference phase of a neural network:

generating computer instruction code for execution in relation to a matrix-multiply operation of the neural network, wherein generating the computing instruction code involves:

for each row r and each column i in a first matrix associated with the neural network:

analyzing an element at row r and column i to determine whether the element is a zero element or a non-zero element; and if the element at row r and column i is a non-zero element:

selecting a next available register from a circular queue of registers;

generating, in the computer instruction code, a vector broadcast instruction to the selected register for the element at row r and column i; and generating, in the computer instruction code, a set of fused multiply-add (FMA) instructions having as parameters the selected register, a set of registers for a target matrix, and a memory location for input data; or if the element at row r and column i is a zero element, omitting corresponding instructions for the element from the computer instruction code; and compiling the computer instruction code into compiled code, wherein the compiled code is configured to be subsequently executed during the inference phase of the neural network to perform the matrix-multiply operation using the vector broadcast instruction and set of FMA instructions generated for each non-zero element.

7. The method of claim 6, further comprising incorporating, into the computer instruction code, an additional set of instructions to combine more than one produced target matrix into a final matrix.

8. The method of claim 6, further comprising determining $R_r$, $R_c$ and $R_L$, where $R_r$ is the number of rows for the first matrix, $R_c$ is the number of registers used for each row of the target matrix, and $R_L$ is the number of registers in the circular queue of registers used as a source for the register for which the vector broadcast instruction is generated.

9. The method of claim 6, wherein the input data is represented as an input data matrix, the method further comprising determining $R_r$ and $R_c$, where $R_r$ is the number of rows for the target matrix, and Rc is the number of registers used for each row of the input data matrix.

10. The method of claim 6, where the first matrix represents neural network parameters.

11. A system comprising:

a processor; and a memory storing instructions that are executable by the processor for causing the processor to perform operations including, prior to an inference phase of a neural network:

generating computer instruction code for execution in relation to a matrix-multiply operation of the neural network, wherein generating the computer instruction code involves:

for each row r and each column i in a sparse neural network parameter matrix associated with the neural network:

analyzing an element at row r and column i to determine whether the element is a zero element or a non-zero element; and if the element at row r and column i is a non-zero element:

generating, in the computer instruction code, a vector broadcast instruction to a register for the element at row r and column i; and generating, in the computer instruction code, a set of fused multiply-add (FMA) instructions having as parameters the register, a set of registers for a target matrix, and a memory location for input data; or if the element at row r and column i is a zero element, omitting corresponding instructions for the element from the computer instruction code; and compiling the computer instruction code into compiled code, wherein the compiled code is configured to be subsequently executed during the inference phase of the neural network to perform the matrix-multiply operation using the vector broadcast instruction and set of FMA instructions generated for each non-zero element.

12. The system of claim 11, wherein generating a vector broadcast instruction to a register comprises:

selecting a next available register from a circular queue of registers for use as the register.

13. The system of claim 11, wherein the operations further comprise:

incorporating, into the computer instruction code, an additional set of instructions to combine more than one produced target matrix into a final matrix.

14. The system of claim 11, wherein the operations further comprise:

determining $R_r$, $R_c$ and $R_L$, where $R_r$ is the number of rows for the sparse neural network parameter matrix, $R_c$ is the number of registers used for each row of the target matrix, and $R_L$ is the number of registers in a queue of registers used as a source for the register for which the vector broadcast instruction is generated.

15. The system of claim 11, wherein the input data is represented as an input data matrix, and wherein the operations further comprise determining $R_r$ and $R_c$, where $R_r$ is the number of rows for the target matrix, and Rc is the number of registers used for each row of the input data matrix.

16. A system comprising:

a processor; and a memory storing instructions that are executable by the processor for causing the processor to perform operations including, prior to an inference phase of a neural network:

generating computer instruction code for execution in relation to a matrix-multiply operation of the neural network, wherein generating the computer instruction code involves:

for each row r and each column i in a first matrix associated with the neural network:

analyzing an element at row r and column i to determine whether the element is a zero element or a non-zero element; and if the element at row r and column i is a non-zero element:

selecting a next available register from a circular queue of registers;

generating, in the computer instruction code, a vector broadcast instruction to the selected register for the element at row r and column i; and generating, in the computer instruction code, a set of fused multiply-add (FMA) instructions having as parameters the selected register, a set of registers for a target matrix, and a memory location for input data; or if the element at row r and column i is a zero element, omitting corresponding instructions for the element from the computer instruction code; and compiling the computer instruction code into compiled code, wherein the compiled code is configured to be subsequently executed during the inference phase of the neural network to perform the matrix-multiply operation using the vector broadcast instruction and set of FMA instructions generated for each non-zero element.

17. The system of claim 16, wherein the operations further comprise:

incorporating, into the computer instruction code, an additional set of instructions to combine more than one produced target matrix into a final matrix.

* * * * *